(12) United States Patent
Koga et al.

(10) Patent No.: US 11,209,960 B2
(45) Date of Patent: Dec. 28, 2021

(54) CONTROL METHOD OF TERMINAL DEVICE

(71) Applicant: Drivemode, Inc., Redwood City, CA (US)

(72) Inventors: Yokichi Koga, Los Altos, CA (US); Shoji Ishida, Chiba (JP); Fernando Silva Ribeiro, Saitama (JP); Joao Felipe Santiago Dos Santos Orui, Tokyo (JP)

(73) Assignee: Drivemode, Inc., Redwood City, CA (US)

( * ) Notice: Subject to any disclaimer, the term of this patent is extended or adjusted under 35 U.S.C. 154(b) by 0 days.

(21) Appl. No.: 16/982,035

(22) PCT Filed: Mar. 19, 2019

(86) PCT No.: PCT/US2019/022875
§ 371 (c)(1),
(2) Date: Sep. 17, 2020

(87) PCT Pub. No.: WO2019/183033
PCT Pub. Date: Sep. 26, 2019

(65) Prior Publication Data
US 2021/0019024 A1 Jan. 21, 2021

Related U.S. Application Data

(60) Provisional application No. 62/644,970, filed on Mar. 19, 2018.

(51) Int. Cl.
*G06F 3/0482* (2013.01)
*G06F 9/451* (2018.01)
(Continued)

(52) U.S. Cl.
CPC .......... *G06F 3/0482* (2013.01); *G06F 9/3838* (2013.01); *G06F 9/451* (2018.02);
(Continued)

(58) Field of Classification Search
CPC ...... G06F 3/0482; G06F 9/451; G06F 9/3838; G06F 9/543; H04M 1/72409; H04M 1/72469; H04M 1/72442
(Continued)

(56) References Cited

U.S. PATENT DOCUMENTS 8,244,307 B1  8/2012  Tilgner et al.
8,811,900 B2  8/2014  Kirsch et al.
(Continued)

OTHER PUBLICATIONS

International Search Report and Written Opinion dated May 30, 2019 in PCT Application No. PCT/US2019/022875.

*Primary Examiner* — William D Titcomb
(74) *Attorney, Agent, or Firm* — McDermott, Will & Emery LLP; Takashi Saito

(57) ABSTRACT

In a control method of a terminal device which includes an OS, a first application, and a second application installed in the OS as a default function which is included in the OS, a first instruction is transmitted by the first application to a connected device. The first instruction is related to an operation of the second application. A second instruction
(Continued)

Figure 1:
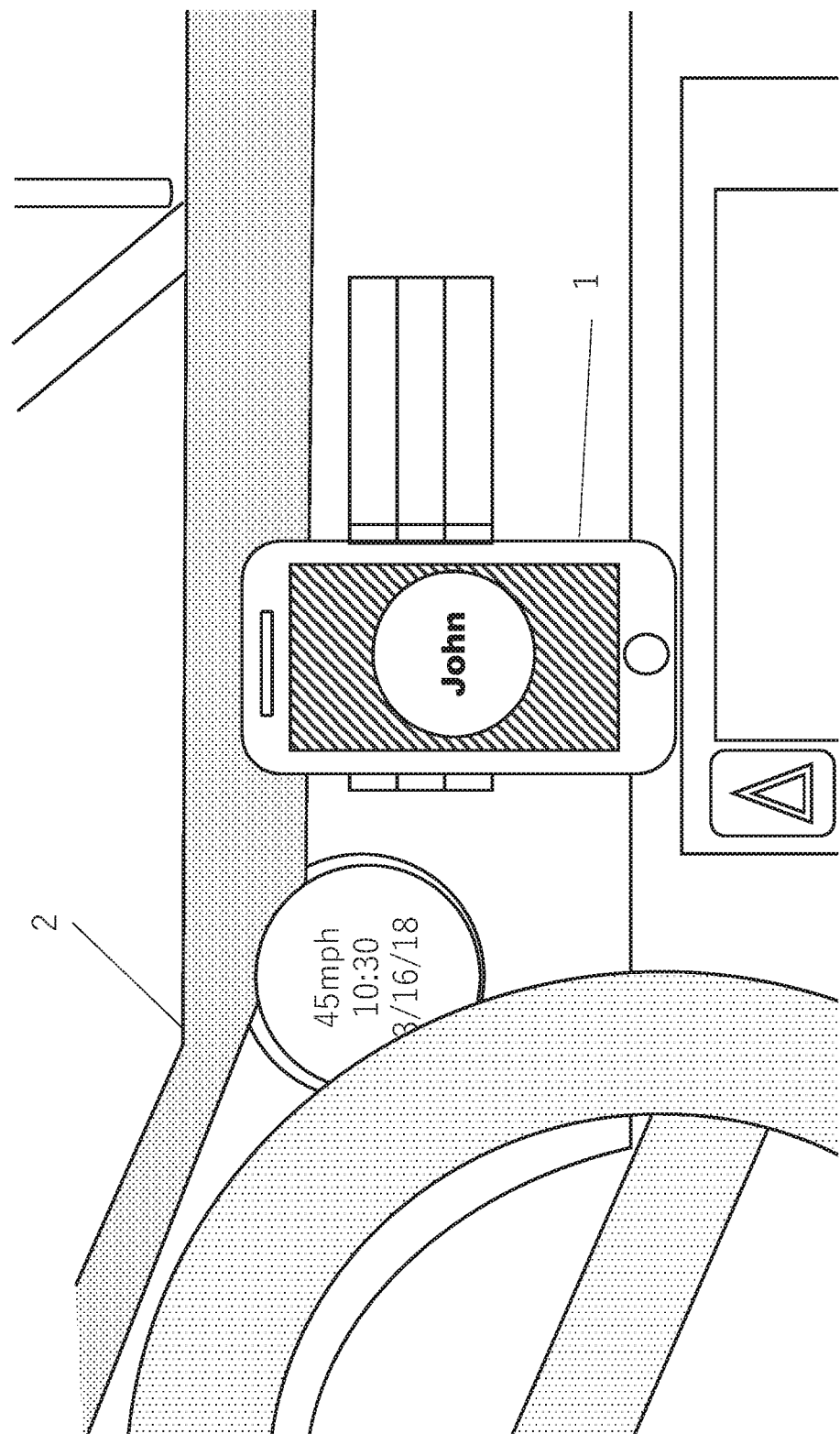

transmitted by the connected device on the basis of a content of the first instruction is received by the terminal device. The second application operates on the basis of the second instruction.

20 Claims, 14 Drawing Sheets

(51) Int. Cl.
*H04M 1/72409* (2021.01)
*H04M 1/72469* (2021.01)
*H04M 1/72442* (2021.01)
*G06F 9/38* (2018.01)
*G06F 9/54* (2006.01)
*H04M 1/7243* (2021.01)

(52) U.S. Cl.
CPC ........ *G06F 9/543* (2013.01); *H04M 1/72409* (2021.01); *H04M 1/72442* (2021.01); *H04M 1/72469* (2021.01); *H04M 1/7243* (2021.01); *H04M 2250/74* (2013.01)

(58) Field of Classification Search
USPC .......................................................... 715/810
See application file for complete search history.

(56) References Cited

U.S. PATENT DOCUMENTS

| | | | |
|---|---|---|---|
| 9,229,623 B1* | 1/2016 | Penilla .................... | B60L 50/66 |
| 9,898,079 B2* | 2/2018 | Koga ..................... | G06F 3/0482 |
| 2003/0011641 A1* | 1/2003 | Totman ................. | G06F 3/0482 |
| | | | 715/810 |
| 2012/0022872 A1 | 1/2012 | Gruber et al. | |
| 2013/0275913 A1* | 10/2013 | Moritz .................. | G06F 3/0481 |
| | | | 715/810 |
| 2014/0258926 A1* | 9/2014 | Min ...................... | G06F 3/0482 |
| | | | 715/808 |
| 2015/0032996 A1* | 1/2015 | Koeberl ................ | G06F 9/3005 |
| | | | 712/205 |
| 2015/0248200 A1* | 9/2015 | Cho .................... | G06F 3/03547 |
| | | | 715/773 |
| 2015/0362991 A1 | 12/2015 | Koga et al. | |
| 2016/0012795 A1* | 1/2016 | Banski ................. | G01C 21/362 |
| | | | 345/520 |
| 2016/0073324 A1 | 3/2016 | Guba et al. | |

* cited by examiner

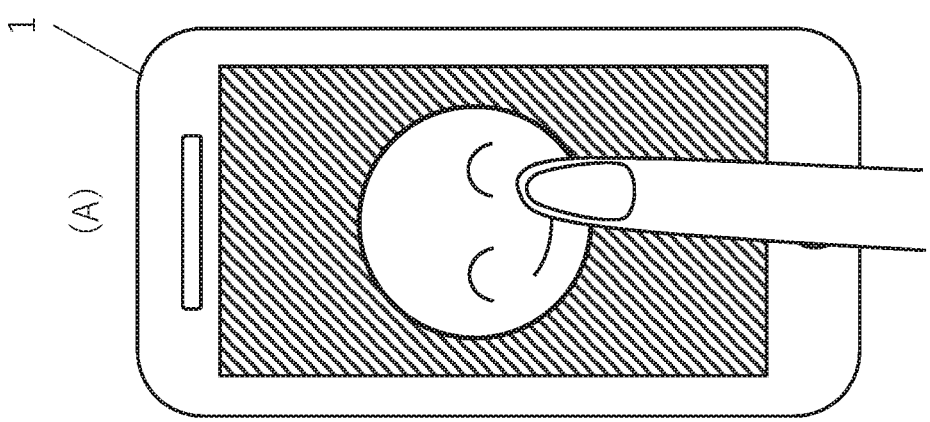
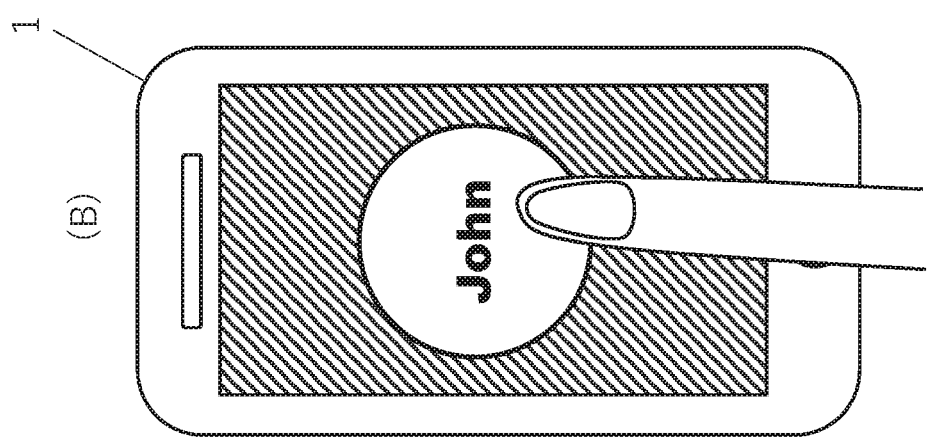
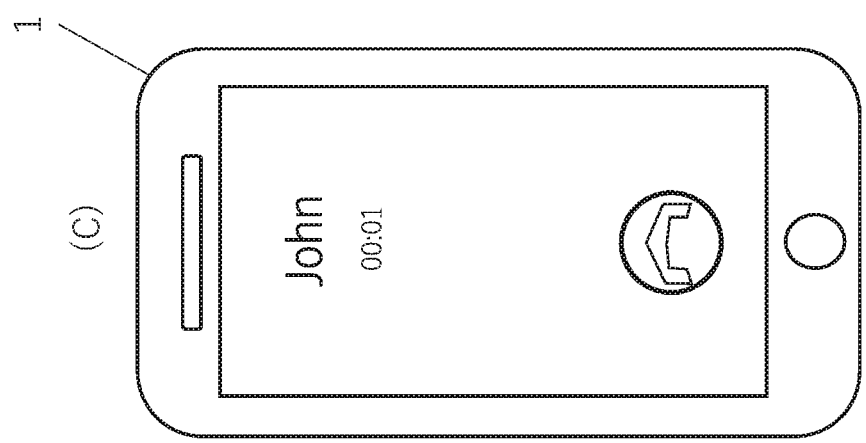
Fig.8

CONTROL METHOD OF TERMINAL DEVICE

RELATED CASES

The present application is a United States National Phase under 35 U.S.C. § 371 of International Application No. PCT/US2019/022875, filed on Mar. 19, 2019, which claims the benefit of, and priority to U.S. Provisional Patent Application No. 62/644,970, filed on Mar. 19, 2018, the entire contents of both of which are incorporated herein by reference for all purposes.

TECHNICAL FIELD

The present disclosure relates to a method of properly controlling a terminal device even in a case where it is hard for a user to keep his vision focused on the terminal device.

BACKGROUND ART

US 2015/0362991 discloses a method of properly controlling the terminal device even in a case where it is hard for the user to keep his vision focused on the terminal device.

CITATION LIST

Patent Literature

Patent Literature 1: US 2015/0362991

SUMMARY OF INVENTION

Technical Problem

According to the above related art, a specific application is used to activate a function of the terminal device, so that the terminal device can be properly controlled even in a case where the terminal device is out of a user's sight.

However, there may be a case where the application is limited to directly use the function of the terminal device depending on the type of OS for controlling the terminal device, or the function of the terminal device to be used.

In this way, in a case where the application is limited to directly use the function of the terminal device, the application is not possible to be available because of the using of the function, and thus the application is unable to be used. Even in a case where the terminal device is out of the user's sight, the terminal device is not properly controlled.

In order to solve the problem, the disclosure provides a control method of a terminal device which can properly control the terminal device even in a case where the terminal device is out of the user's sight.

DESCRIPTION OF EMBODIMENTS

Hereinafter, specific embodiments (hereinafter, referred to as "this embodiment") of the control method of the terminal device according to the disclosure will be described in detail with reference to the accompanying drawings. In some cases, detailed descriptions may be omitted. For example, the redundant descriptions on the details of well-known matters and the substantially equal configurations may be omitted. Such omissions are to avoid unnecessary redundancy in the following description, and to help with understanding of those who skilled in the art. Further, the accompanying drawings and the following descriptions are merely offered to those who skilled in the art to sufficiently understand the disclosure, and not intended to limit the subject scope disclosed in claims. In addition, this specification contains US 2015/0362991, the entire contents of which being incorporated herein by reference.

Hereinafter, an example of this embodiment will be described using the drawings.

[System Configuration]

The system configuration will be schematically described using FIGS. 1 to 4.

FIG. 1 is a diagram illustrating an example of a situation where a terminal device and a connected device are used. FIG. 1 illustrates a situation of the vicinity of a driver seat when viewed from the inside of a vehicle.

As illustrated in FIG. 1, a smart phone as the terminal device 1 is connected to the vehicle (including an information processing device which is mounted or installed in the vehicle) as the connected device 2 as an example of this embodiment. Specifically, the description will be given about a method of properly controlling the terminal device 1 in order to focus on the driving of the vehicle even in a case where the user of the vehicle can hardly keep his vision focused on the terminal device 1.

Figure 2:
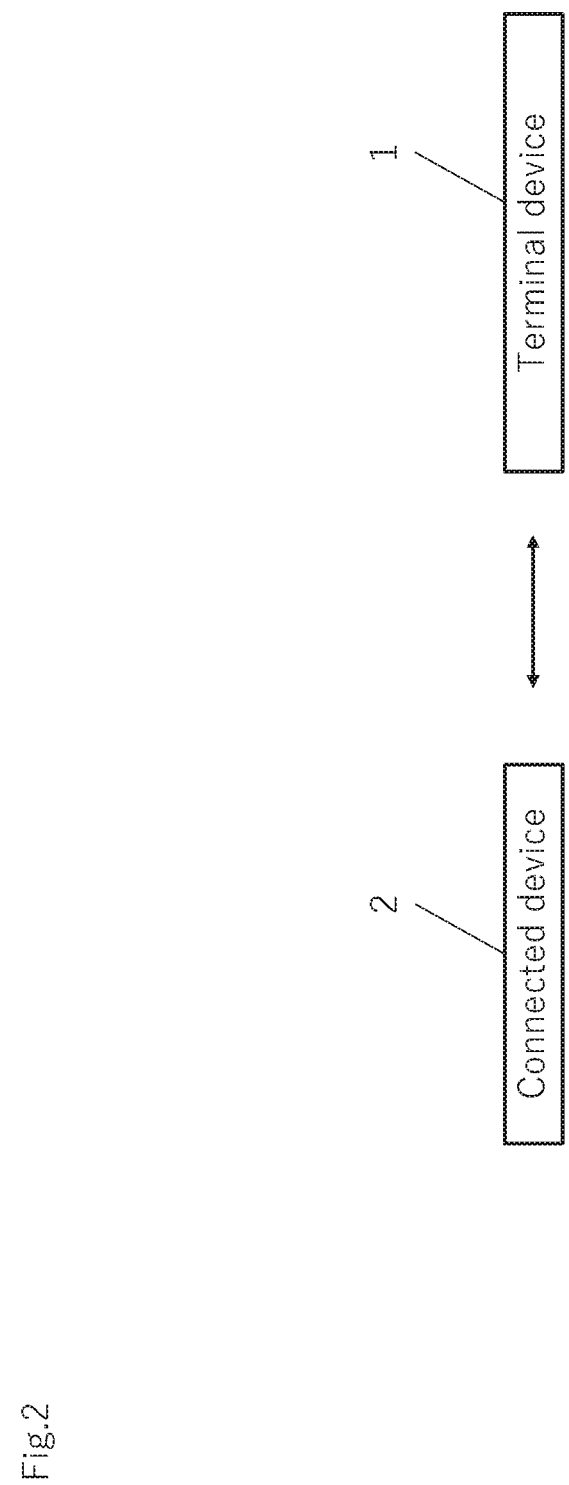

FIG. 2 is a block diagram illustrating the connection between the terminal device and the connected device 2.

As illustrated in FIG. 2, the terminal device 1 and the connected device 2 can communicate with each other. As a method of connecting the terminal device 1 and the connected device 2, various methods may be considered. As an example of a method of connecting the terminal device 1 and the connected device 2, a Bluetooth connection, a USB connection, and a Wi-Fi connection may be exemplified, but not limited thereto. Any method of connecting the terminal device and the connected device 2 may be used as long as the communication between devices is possible.

Figure 3:
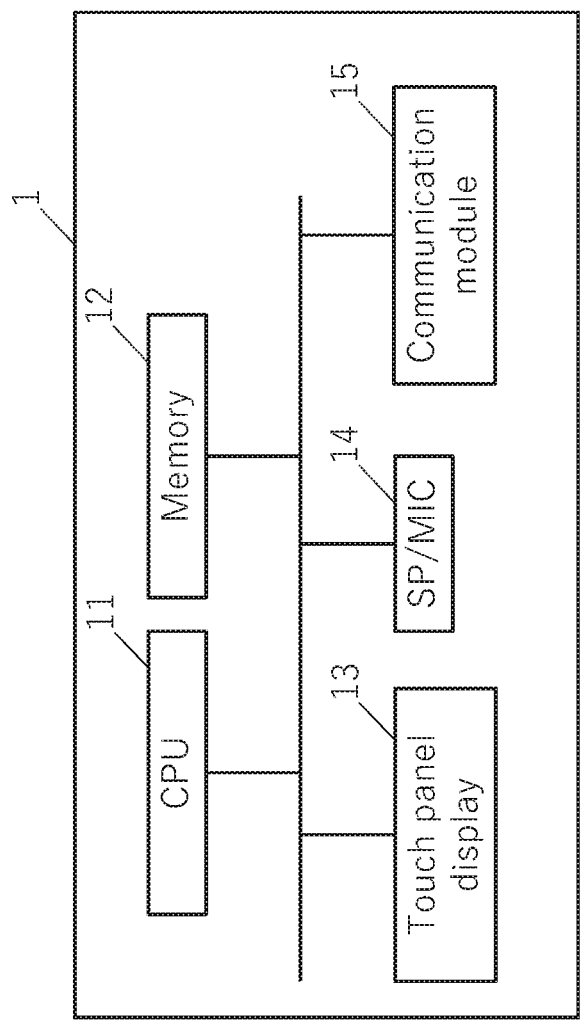

FIG. 3 is a block diagram schematically illustrating a configuration of the terminal device.

A CPU 11 controls other components of the terminal device 1.

A memory 12 temporally or permanently stores information which is necessary for the control of the terminal device 1.

A touch panel display 13 is disposed in the surface of the terminal device 1, and receives an operation from the user while displaying the information.

An SP/MIC (Speaker and Microphone) produces sounds to the user, and receives the sounds produced by the user.

A communication module 15 is a module for at least one of the communication with the Internet, the communication with a telephone line (4G/LTE etc.), and the communication with the connected device 2.

Figure 4:
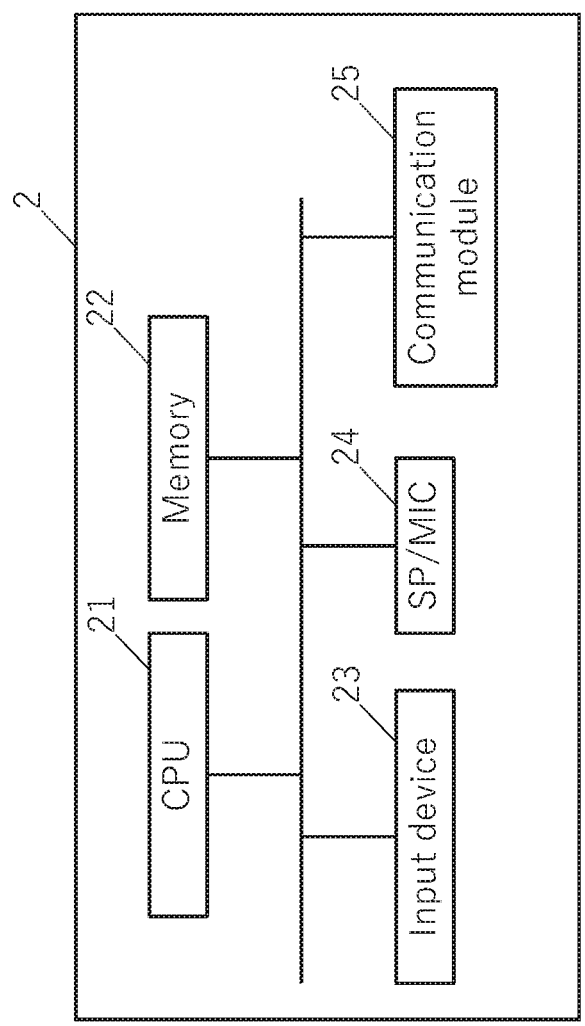

FIG. 4 is a block diagram schematically illustrating a configuration of the connected device.

A CPU 21 controls other components of the connected device 2.

A memory 22 temporally or permanently stores information which is necessary for the control of the connected device 2.

An input device 23 is disposed in the vicinity the user of the connected device 2, and receives a user's operation.

An SP/MIC (Speaker and Microphone) 24 produces sounds to the user, and receives the sounds produced by the user.

A communication module 25 is a module for at least one of the communication with the Internet, the communication with a telephone line (4G/LTE etc.), and the communication with the terminal device 1.

Further, specific configurations of the terminal device 1 and the connected device 2 are not limited to the configurations illustrated in FIGS. 3 and 4. Some components may be omitted to achieve an object of the disclosure, may be combined, or may be changed. For example, in the terminal device 1, a facial expression recognition may be performed using a camera in order to receive a user's input necessary in the implementation of the disclosure. As another example, a touch panel on a dash board may be used in the connected device 2 in order to receive a user's input necessary for the implementation of the disclosure.

In FIG. 1, a specific application (first application) is operated in a foreground on the terminal device 1. The first application displays an operation region in the GUI to make a phone call from the terminal device. Specifically, if the user touches an operation region, the application may make a phone call to a person called John. As illustrated in FIG. 1, the first application displays the operation region for making a phone call with an even color or pattern in the dominant region of the screen on the terminal device 1. With this configuration, the user can properly recognize a place and a function of the operation region even if the terminal device 1 is out of sight. Therefore, the user can operate the operation region even in a case where the user can hardly keep his vision focused on the terminal device 1.

Herein, in order to make an actual phone call using the system illustrated in FIG. 1, the OS of the terminal device 1 necessarily operates the application (telephone function) (second application) which is provided as standard in conjunction with the operation of the first application. In other words, it is necessary to realize a behavior of directly controlling the second application from the first application.

However, means for controlling the second application from another application may be, totally or partially, technically limited or substantially disabled depending on the OS. Such a case is called "the second application is prohibited from being directly controlled from the other application".

Hereinafter, the outline of the system operation to solve the above problem will be described using FIG. 5.

[Outline of System Operation]

Figure 5:
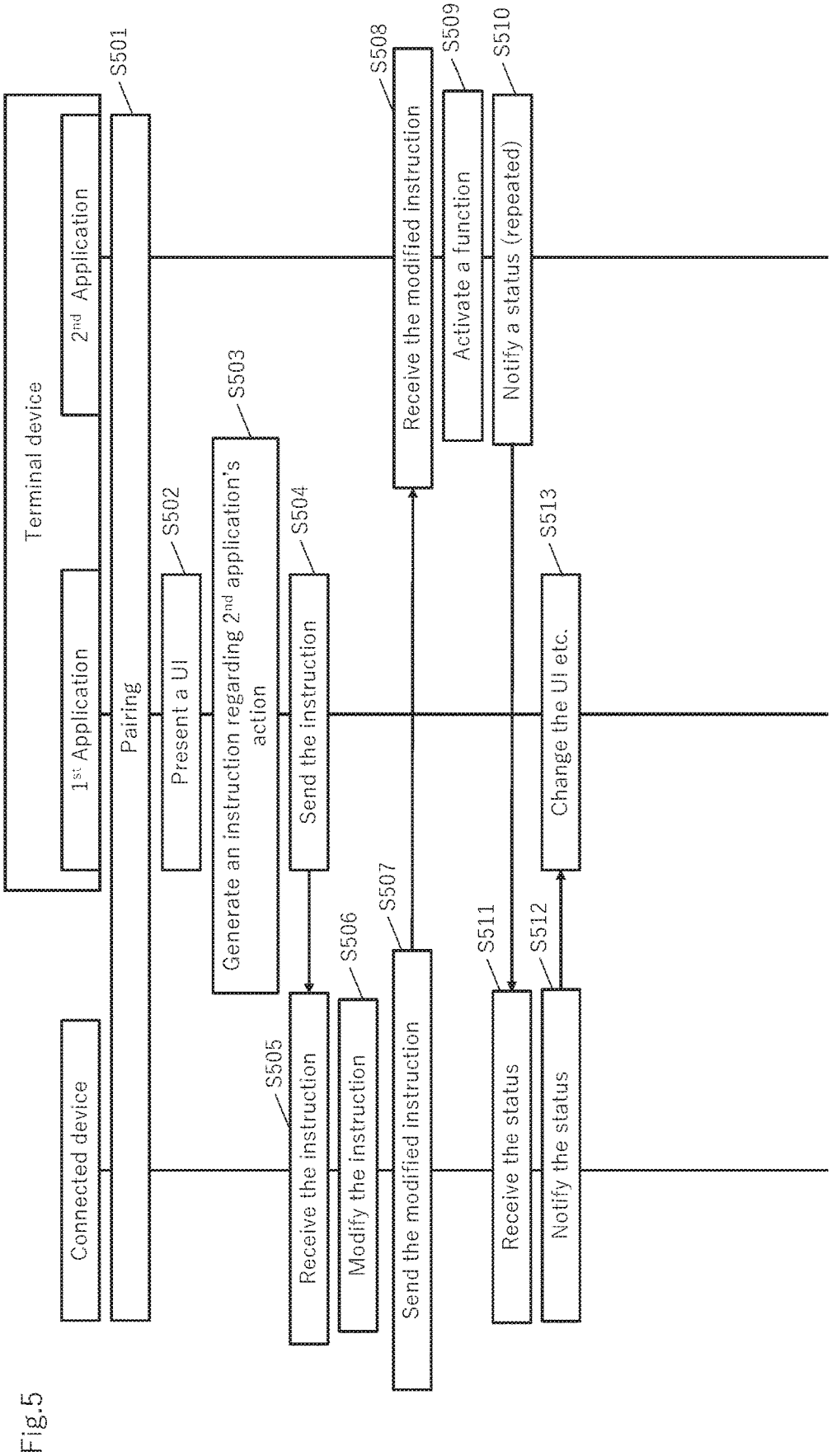

FIG. 5 is a chart illustrating the outline of the system operation.

As illustrated in FIG. 5, the system operation is realized by exchanging information between the first application and the second application which are installed in the connected device 2 and the terminal device 1. Further, the exchange of the information is realized by the operation of hardware elements other than the CPUs 11 of the connected device 2 and the terminal device 1.

In Step S501, the connected device 2 and the terminal device 1 are paired with each other. The pairing means that the connected device 2 and the terminal device 1 can communicate to each other. In this embodiment, a Bluetooth pairing will be described as an example of the pairing. A specific method of pairing is not limited to the Bluetooth pairing. A USB connection may also be exemplified as the paring.

In Step S502, the first application displays a UI of the first application on a touch panel display of the terminal device 1. Step S502 is performed after the user activates the first application, or after a moving speed (which may be obtained from information acquired from a geographical information acquisition sensor (GPS etc.; not illustrated), or information acquired from the connected device 2) of the terminal device 1 exceeds a predetermined speed.

Figure 6:
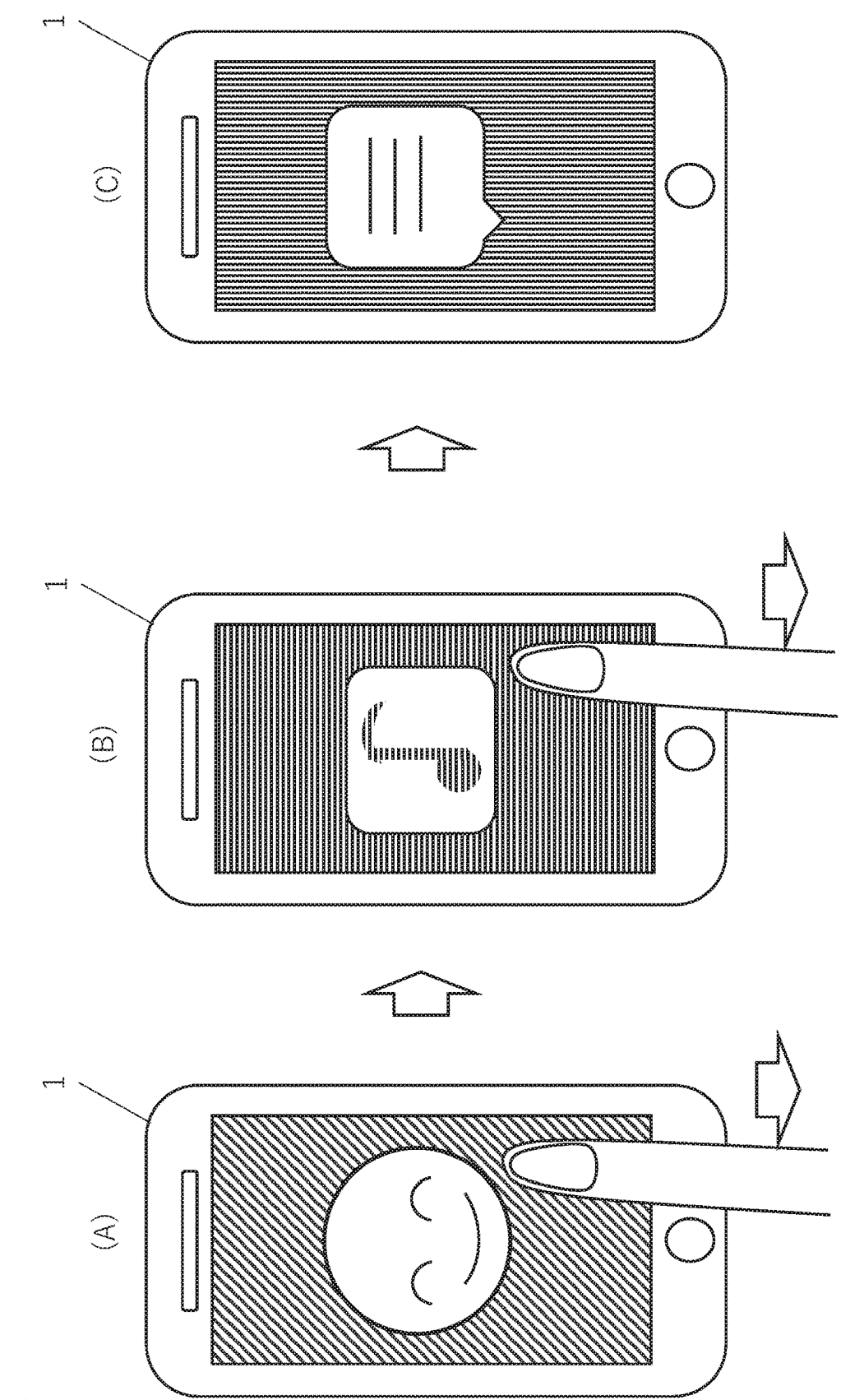

FIG. 6 is a diagram illustrating an example of the UI of the first application.

As illustrated in FIG. 6, the UI of the first application occupies the dominant region of the screen. The UI of the first application includes an icon region and the other region. When touching the icon region, the user can operate a function such as telephone, music play, text (message) transmission, navigation, voice recognition, item order, and roadside service according to the type of icon. When clicking the other region, or operating the input device 23 (for example, a remote controller or a steering key) disposed in the connected device 2, the UI is changed to a screen of displaying an icon to operate other functions. Specifically, in a case where a region other than a human face icon (an icon for operating the telephone function) at the center as illustrated in FIG. 6(A) is clicked in a downward direction, the UI is shifted to a musical note icon (an icon for operating a musical function) as illustrated in FIG. 6(B). In addition, the other region has an even pattern (color and/or shape) different from each other according to the type of the icon.

In Step S503, the first application generates a first instruction related to the operation of the second application. The first instruction related to the operation of the second application refers to "the instruction which can exhibit the function of the second application by interpreting at least a part of the instruction by the second application" and/or "the instruction which can exhibit the function of the second application by generating at least a part of the instruction as an argument or by generating an argument on the basis of at least a part of the instruction, by the second application".

In the following, the first instruction related to the operation of the second application will be specifically described.

Second Application First Instruction
Telephone application Call Request+Telephone Number
Text Application Message Transmission Request+Telephone Number+Content of Text
Music Application Music Information Transmission Request
Music Application Music Play Request
Voice Assistant Application Voice Assistant Activation Request In Step S504, the first application transmits the first instruction to the connected device 2. In general, the first instruction is considered to be transmitted from the first application to the second application. However, as illustrated above, it is prohibited that the second application is directly controlled from the other application in this embodiment. Therefore, in this embodiment, the first instruction is transmitted to the connected device 2 to solve the above problem. Further, the first instruction in this embodiment is transmitted using a BLE (Bluetooth Low Energy) protocol.

In Step S505, the connected device 2 receives the first instruction.

In Step S506, the connected device 2 modifies the first instruction. This step is specifically effective in a case where the first instruction is not possible to be transmitted as it is to the second application, but not essential in a case where the first instruction is possible to be transmitted as it is to the second application. In this embodiment, a modification for transmitting the first instruction using a BT (Bluetooth) protocol is performed in Step S506 on the basis of the first instruction transmitted using the BLE protocol. Further, the modified instruction is called a second instruction in order to make a difference from the first instruction. However, even in a case where the instruction is not modified (while the content is equal), the instructions will be distinguished from each other using the expression "N-th" in order to clear the transmission subject in the disclosure. In other words, the different portion of "N-th" does not necessarily mean that the content of the instruction is different. Further, in a case where the connected device 2 receives an instruction from the first or second application in this embodiment, and transmits the received instruction to the second or first application, the step similar to Step S506 may be performed. However, the step may be omitted in other drawings to simplify the description.

In Step S507, the connected device 2 transmits the second instruction to the second application on the terminal device 1. As described above, in this embodiment, it is prohibited that the second application is directly controlled from the other application. However, even in such a case, the control of the other device on the second application may be not limited. In this embodiment, using such characteristics, a behavior for controlling the second application from the first application can be realized by interposing the connected device 2.

In Step S508, the second application receives the second instruction.

In Step S509, the second application performs the function thereof. The execution is an operation performed on the basis of the second instruction. The content of the performed function is based on the content of the first instruction (described in detail below). In Step S509, the UI of the foreground may be switched to the second application. Further, in a case where an output such as voice is necessary when the second application performs the function thereof, a speaker installed in the connected device 2 may perform the output.

In Step S510, the second application transmits the state (the state of the second application) of the function performed in Step S509 to the connected device 2. The state is transmitted using the BT protocol. Such a configuration is to make the state of the connected device 2 or the first application easily charge in the state of the second application. Therefore, in a case where there is a substitute process of Step S510 (for example, a displaying screen after the second application ends is set in advance), Step S510 and the related steps may be omitted. Further, Step S510 may be looped periodically or by being triggered at the change of the state of the second application depending on the function to be performed in the second application. For example, in a case where the second application is the voice recognition function, Step S510 is performed once at the time of activation. In addition, in a case where the second application is the telephone function, Step S510 is performed by being triggered at the change of the calling state.

In Step S511, the connected device 2 receives the state of the second application.

In Step S512, the connected device 2 transmits the state of the second application to the first application. Further, while not illustrated in the drawing, the state of the second application may also be modified by the connected device 2 similarly to Step S506. Even in this embodiment, similarly to Step S506, the state of the second application is modified and transmitted using the BLE protocol between Steps S511 and S512.

In Step S513, the first application changes the UI on the basis of the state of the second application. The details will be given in the description of the individual functions to be described below.

Hitherto, the outline of the system operation has been given using FIG. 5.

In the following, more specifically, the description will be given on the basis of the outline of the system operation about how the operations of the individual functions (telephone function, message transceiving function, music play function, voice assistant function) of the second application are performed. Further, there may be a case where a step not mentioned in the outline of the system operation may be performed depending on the individual functions, which will be also described.

[Phone Calling Operation]

Hereinafter, the phone calling operation will be described using FIG. 7.

Figure 7:
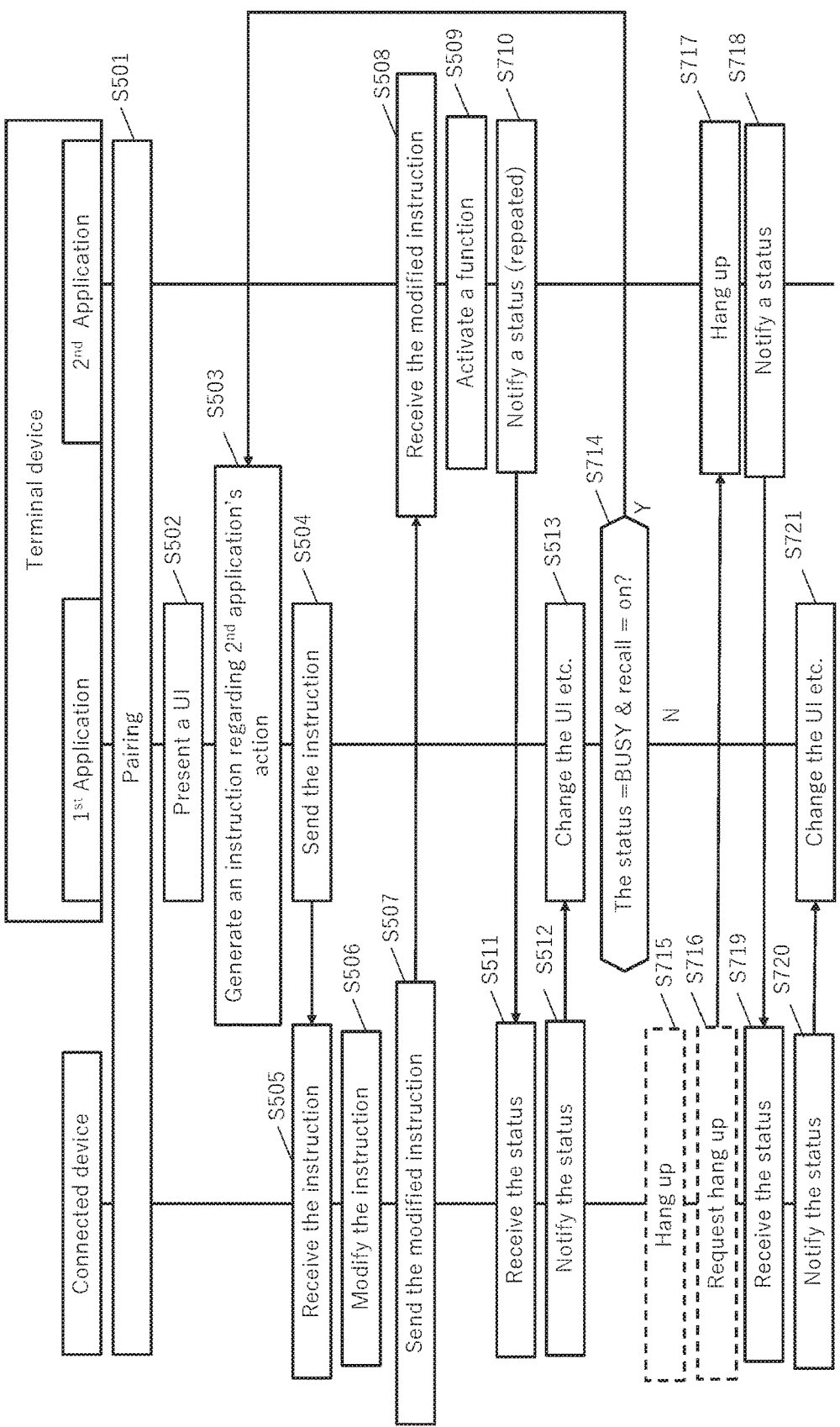

FIG. 7 is a chart illustrating the outline of the phone calling operation. The substantially equal configurations in FIG. 7 to those in the steps illustrated in FIG. 5 will be attached with the same symbol as that of FIG. 5, and the description thereof will be omitted. Only the description of the phone calling operation will be given.

In Step S502, the UI illustrated in FIG. 8(A) or 8(B) is displayed in the foreground of the terminal device 1 as the UI of the first application. FIG. 8(A) is the UI for selecting the telephone function. The UI is shifted to FIG. 8(B) when the center in FIG. 8(A) is touched. FIG. 8(B) is the UI for selecting a contact to which the phone calling is made.

In Step S503, Call Request+Telephone Number is generated as the content of the first instruction. Further, Step S503 is performed at the time when the icon at the center indicating a specific contact in FIG. 8(B) is touched.

In Step S509, a call process is performed by the telephone application as the second application. At this time, FIG. 8(C) is displayed in the foreground of the terminal device 1 as the UI of the telephone application. The screen of the first application which has been displayed until now is switched to the background. In this way, the operation that the UI of the first application is switched to the background and the UI of the second application is displayed in the foreground is expressed as "the display screen of the first application is ended, and the display screen of the second application is displayed". Further, in the expression "the display screen of the first application is ended, and the display screen of the second application is displayed", a state that the first application is displayed partially is included while the second application is dominantly displayed.

In Step S710, a calling state such as "in a call (and calling time), calling, counterpart BUSY, and calling end" is transferred as the state of the second application to the connected device 2.

In Step S513, the first application performs recording of the calling state in the first application, and updating of the UI of the first application on the background. In this way, with the updating of the UI, the UI of the first application can be updated according to the calling state with the appropriate content which is displayed after the second application ends. For example, the calling time acquired from the calling state can be displayed on the first application after the calling ends. In addition, it may be considered that the UI is updated to a UI in which the user can return the call to the calling destination again after ending the calling.

In Step S714, the first application determines whether the calling state is counterpart BUSY (a case where there is no answer even to several calling), and the automatic recall setting is set ON in the setting in the first application. In the case of Yes in Step S714, the process is looped to Step S503.

The phone calling ends in Step S715. Step S715 is a process performed by the connected device 2 as an interrupt process (not necessarily performed by the connected device 2 (see Step S717), and indicated with a broken line). Step S715 is performed when the input device 23 in the connected device 2 receives an input.

In Step S716, the connected device 2 transmits a calling end request to the second application. Step S716 is performed when Step S715 is performed by the connected device 2. The calling end request is transmitted using the BT protocol. Further, a series of steps related to Step S716 may be a process of transmitting the calling end request to the second application via the connected device 2 with the first application as a trigger (in this case, the calling end request from the first application to the connected device 2 is performed using the BLE protocol).

In Step S717, the phone calling ends. Step S717 is a process performed by the second application as an interrupt process. In the second application, the icon displayed in the lower portion of FIG. 8(C) is touched to perform Step S717. In addition, Step S717 is performed even though being shifted from Step S716. In addition, when Step S717 is performed, the UI of the second application displayed in the foreground ends, and the UI of the first application may return to the foreground.

In Step S718, the state (calling end state) of the second application is transmitted to the connected device 2 using the BT protocol similarly to Step S510.

In Step S719, the connected device 2 receives the state of the second application.

In Step S720, the state (calling end state) of the second application is transmitted to the first application using the BLE protocol similarly to S510 and S512.

In Step S721, similarly to Step S513, the recording of the calling state in the first application and the updating of the UI of the first application on the background are performed. Specifically, the final calling time is displayed as a screen after the calling end. The UI immediately before the calling is displayed. The screen returns to the navigation screen if it is in navigation.

[Music Play Operation]

Hereinafter, the music play operation will be described using FIGS. 9 and 10.

Figure 9:
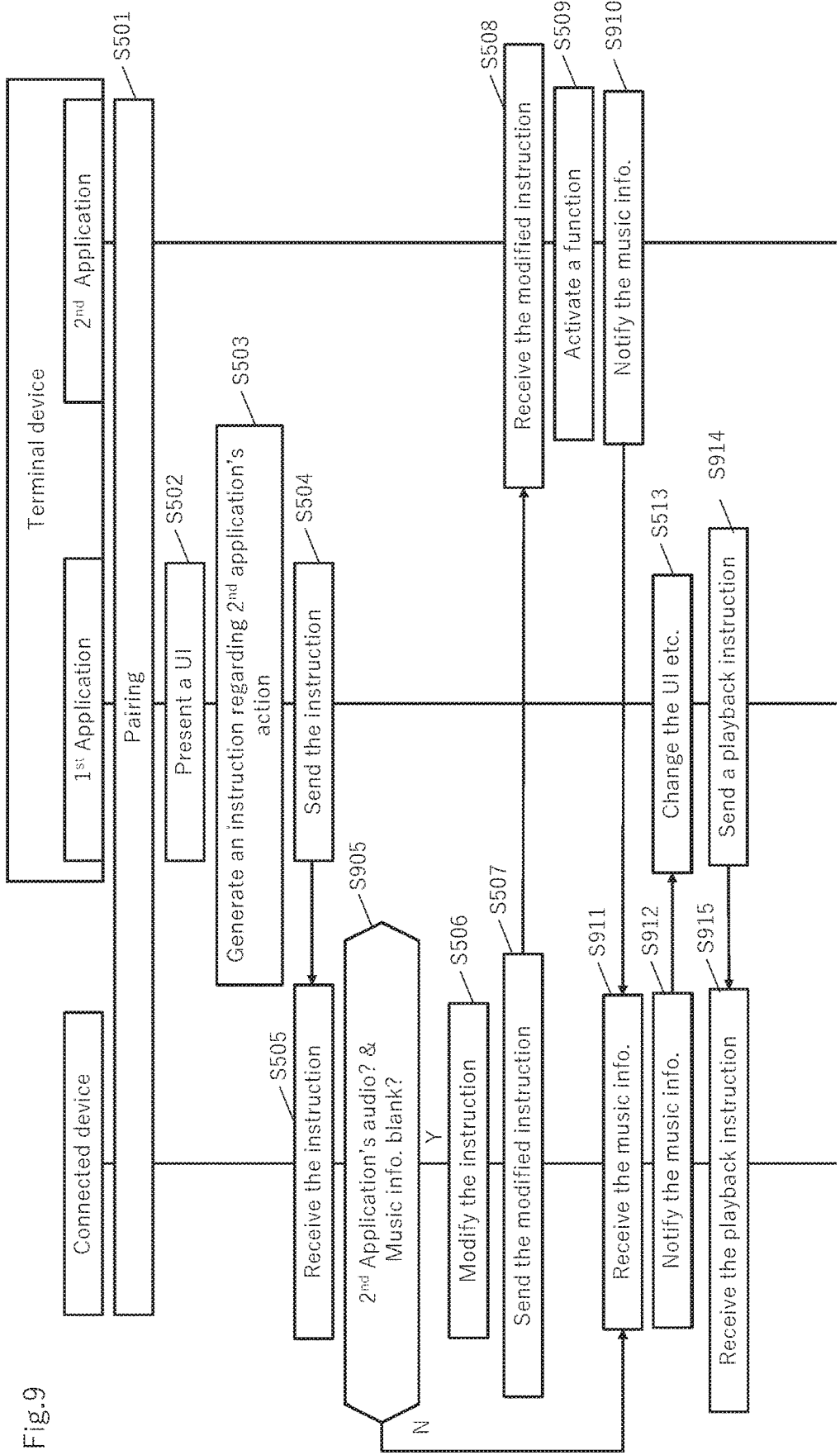
Figure 10:
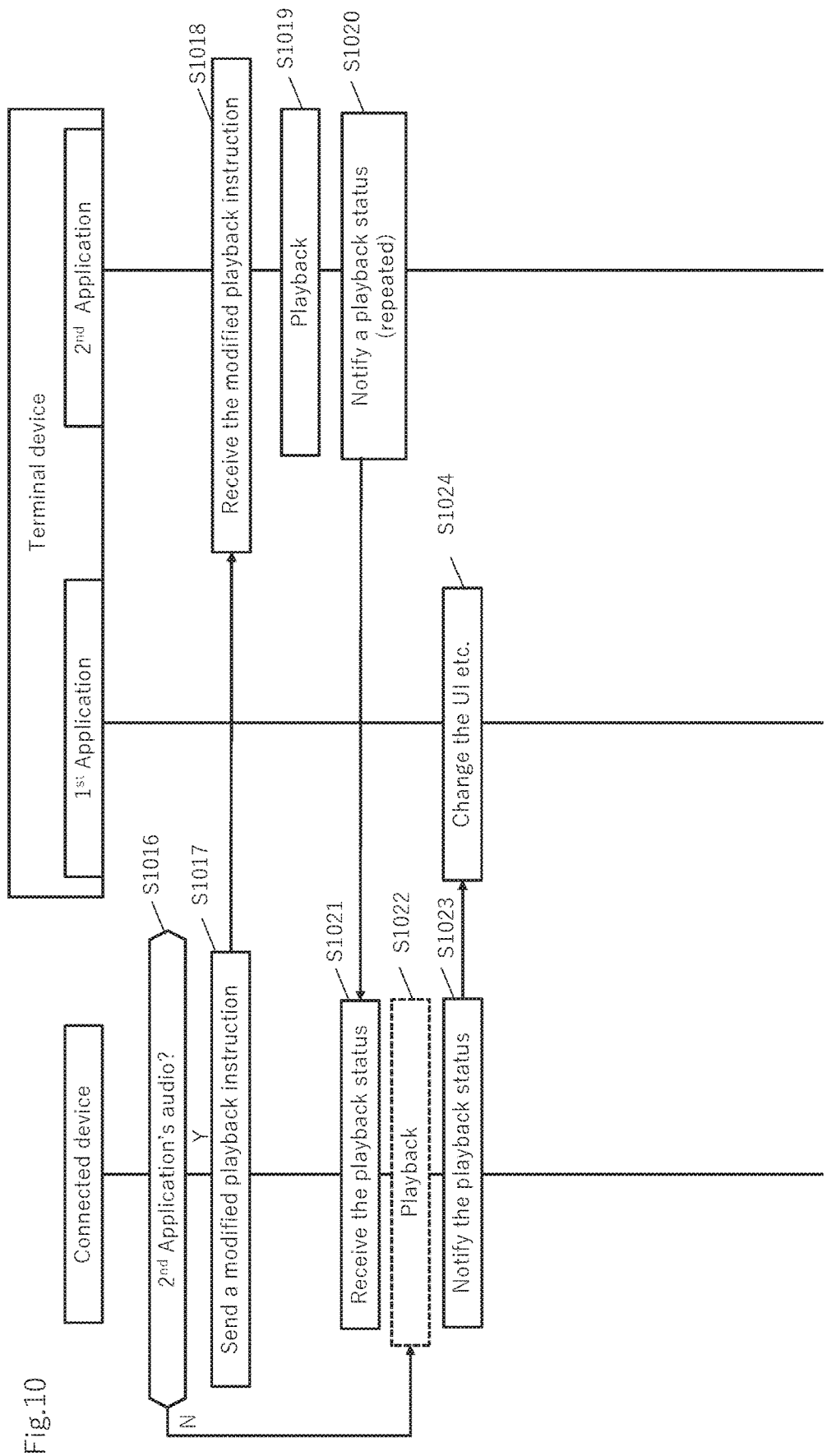

FIGS. 9 and 10 are charts illustrating the outline of the music play operation (which illustrating two drawings for the narrow sheet). In FIGS. 9 and 10, the substantially equal configurations to those of the steps illustrated in FIG. 5 will be attached with the same symbol as that of FIG. 5, and the description thereof will be omitted. Only the description of the music play operation will be given.

In Step S502, the UI displayed when touching the icon at the center in FIG. 6(B) or 8(A) as the UI of the first application is displayed in the foreground of the terminal device 1. FIG. 6(B) is the UI for selecting the music play function. When the icon at the center in FIG. 6(B) is touched, the UI is shifted to the screen to select play information. The play information is information which contains specific music information (title, artist name, etc.) in addition to a music source (music in the second application (music application) such as a CD connected to a radio set or the connected device 2). Further, as a specific example that the music source is the second application, there is a case where the music source is a Bluetooth audio.

In Step S503, the music information transmission request containing the play information as the content is generated as the content of the first instruction. Further, Step S503 is performed at the time of selecting specific play information in the screen to select the play information.

In Step S905, the connected device 2 has the content of the first instruction in which the second application is the music source, and determines whether the music information is stored in the connected device 2.

In Step S506 (Yes in Step S905), the music information transmission request is converted to the BT protocol as the second instruction. Further, the second instruction may be an instruction obtained by erasing the music source from the first instruction.

In Step S509, a music information acquisition process is performed by a music play application as the second application.

In Step S910, the acquired music information is transferred to the connected device 2 using the BT protocol.

In Step S911 (the shifting from Step S910, or No in Step S905), the connected device 2 acquires the music information. In a case where the music source is a radio set, the music information is acquired from the radio-broadcasting signals. Even in a case where the music source is a CD, the music information can be acquired from the CD.

In Step S912, the music information is transmitted to the second application using the BLE protocol.

In Step S513, the music information is displayed in the first application operating in the foreground together with a play button.

In Step S914, the music play request having the play information as the content corresponding to the music information displayed in Step S513 is transmitted to the connected device 2 using the BLE protocol. Step S915 is performed when the user touches the play button on the first application.

In Step S915, the connected device 2 receives the music play request.

In Step S1016, the connected device 2 determines whether the music source information which is the content of the music play request is information having the second application as the music source.

In Step S1017 (Yes in Step S1016), the music play request converted into a BT protocol format is transmitted to the second application.

In Step S1018, the second application receives the music play request.

In Step S1019, the second application plays the music. Further, even in a case where Step S1019 is performed in this embodiment, the screen of the first application is displayed in the foreground of the terminal device 1.

In Step S1020, the second application transmits the play state of the music to the connected device 2 in the BT protocol format. In the play state, information indicating a progressing state of the current music is included.

In Step S1021, the connected device 2 receives the play state.

In Step S1022 (No in Step S1016), the connected device 2 plays the music of a radio set or a CD according to the music play request.

In Step S1023, the connected device 2 transmits the play state received in Step S1021 or the play state of the music played in Step S1022 to the first application in the BLE protocol format.

In Step S1024, the first application reflects the received play state on the UI.

[Message Transmission Operation]

Hereinafter, the message transmission operation will be described using FIG. 11.

Figure 11:
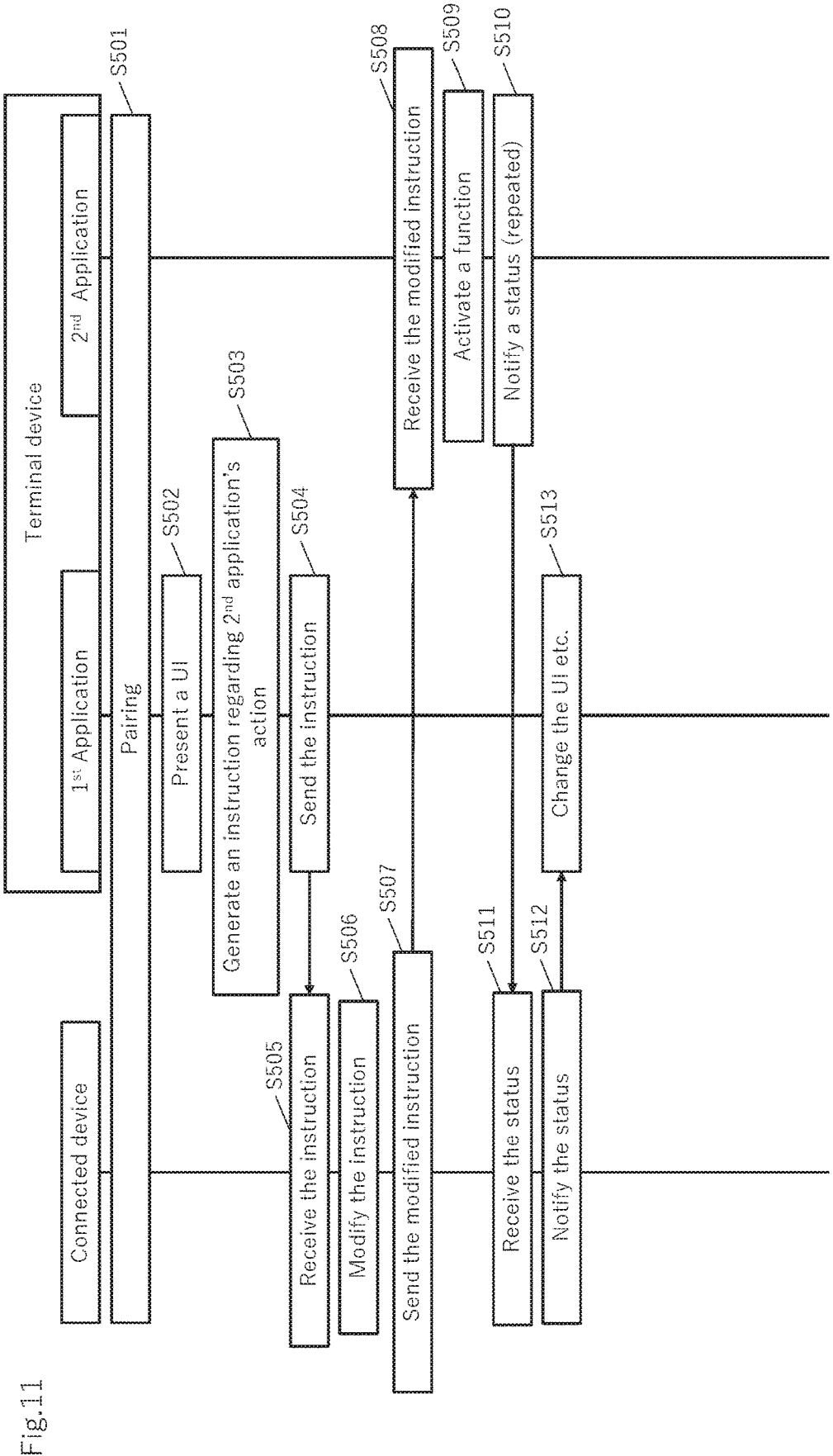

FIG. 11 is a chart illustrating the outline of the message transmission operation. In FIG. 11, the substantially equal components as those of the steps described in FIG. 5 will be attached with the same symbol as that of FIG. 5, and the description thereof will be omitted. Only the description of the message transmission operation will be given.

Figure 12:
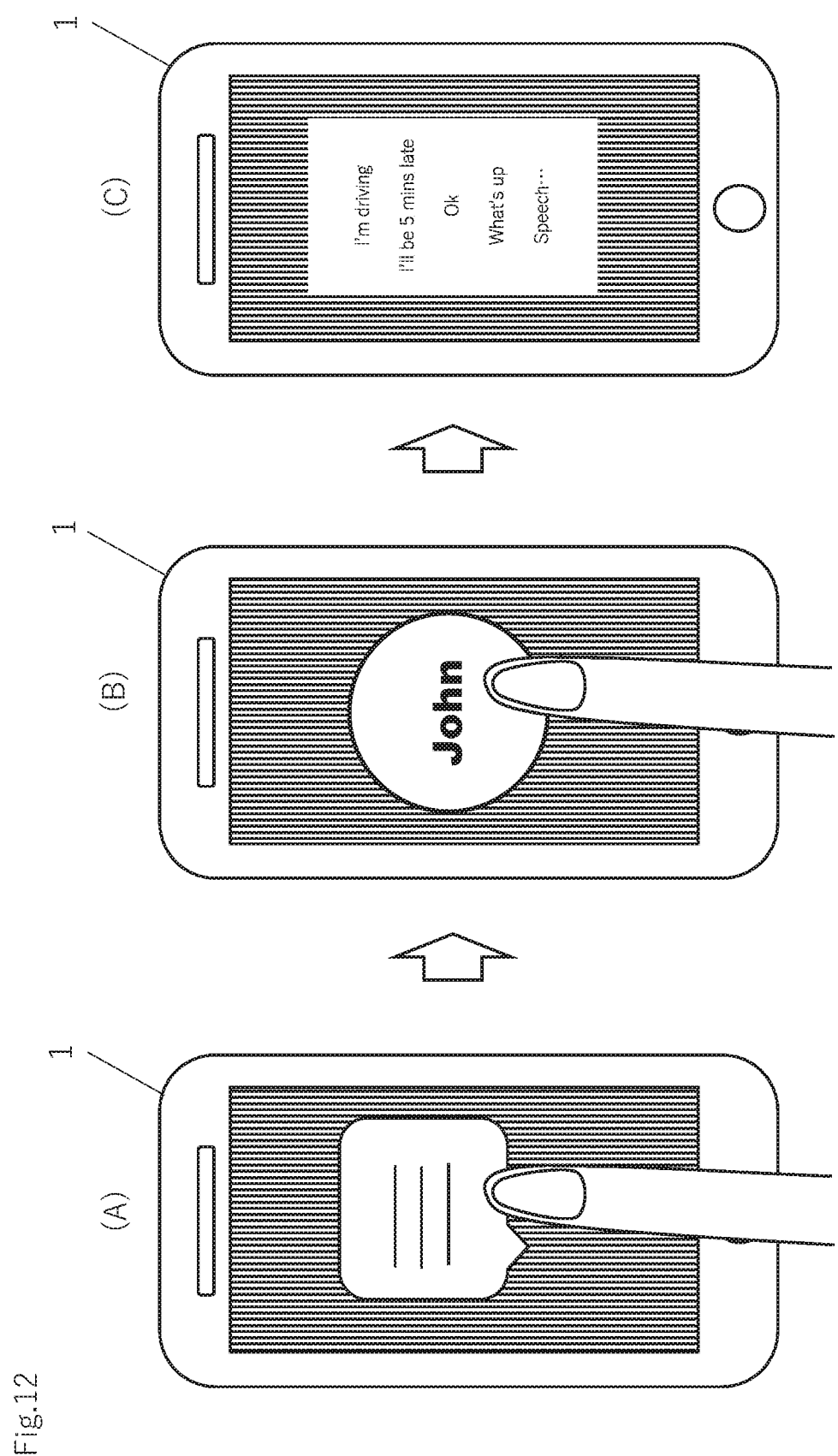

In Step S502, the UI illustrated in FIG. 12(A) (B or C) as the UI of the first application is displayed in the foreground of the terminal device 1. FIG. 12(A) is the UI for selecting a message function. When the icon at the center in FIG. 12(A) is touched, the UI is shifted to FIG. 12(B). FIG. 12(B) is the UI for selecting a contact to which the message is transmitted. When the icon at the center in FIG. 12(B) is touched, the UI is shifted to FIG. 12(C). FIG. 12(C) is the UI for selecting a message to be transmitted to the contact (further, when "Speech . . . " in FIG. 12(C) is selected, the voice recognition starts, and the content recognized in the voice recognition becomes the content of the message; see [voice assistant activation operation] described below for the subsequent process).

In Step S503, Message Transmission Request+Telephone Number+Content of Text is generated as the content of the first instruction. Further, Step S503 is performed at the time when a sentence indicating the content of a specific message in FIG. 12(C) is touched, or at the time of performing the voice recognition.

In Step S509, a message transmission process is performed by a message application as the second application. Even in a case where Step S509 is performed in this embodiment, the UI of the first application is displayed in the terminal device 1.

In Step S510, a message state such as "transmitting, arrived, and read" as the state of the second application is transmitted to the connected device 2.

In Step S513, the message state is registered in the first application, and the updating of the UI of the first application on the background is updated.

[Voice Assistant Operation]

Hereinafter, the voice assistant operation will be described using FIG. 13.

Figure 13:
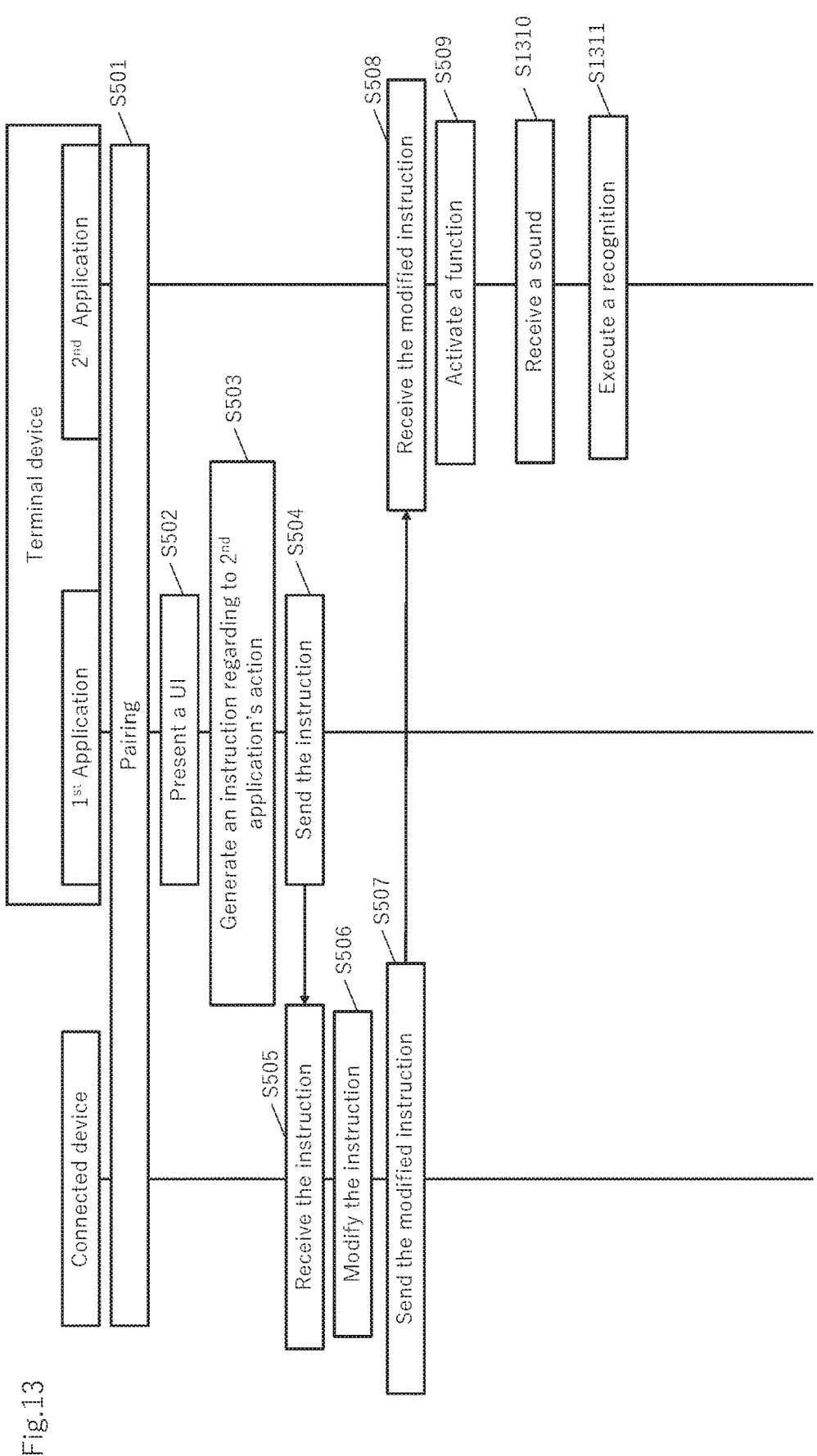

FIG. 13 is a chart illustrating the outline of the voice assistant operation. In FIG. 13, the substantially equal components to those of the steps described in FIG. 5 will be attached with the same symbol as that of FIG. 5, and the description thereof will be omitted. Only the description of the voice assistant operation will be given.

In Step S502, a voice assistant activation icon is displayed as the UI of the first application.

In Step S503, the music assistant activation request is generated as the content of the first instruction. Further, Step S503 is performed at the time when the user selects the voice assistant activation icon, or when the user makes an input in the input device 23 of the connected device 2.

In Step S509, the activation process in the voice application as the second application is performed.

In Step S1310, the second application receives a voice input. Specifically, the second application receives the voice made by the user through a microphone or the connected device 2 of the terminal device 1.

In Step S1311, the second application performs the voice recognition on the received voice.

[Telephone Incoming Operation]

Hereinafter, the telephone incoming operation will be described using FIG. 14.

Figure 14:
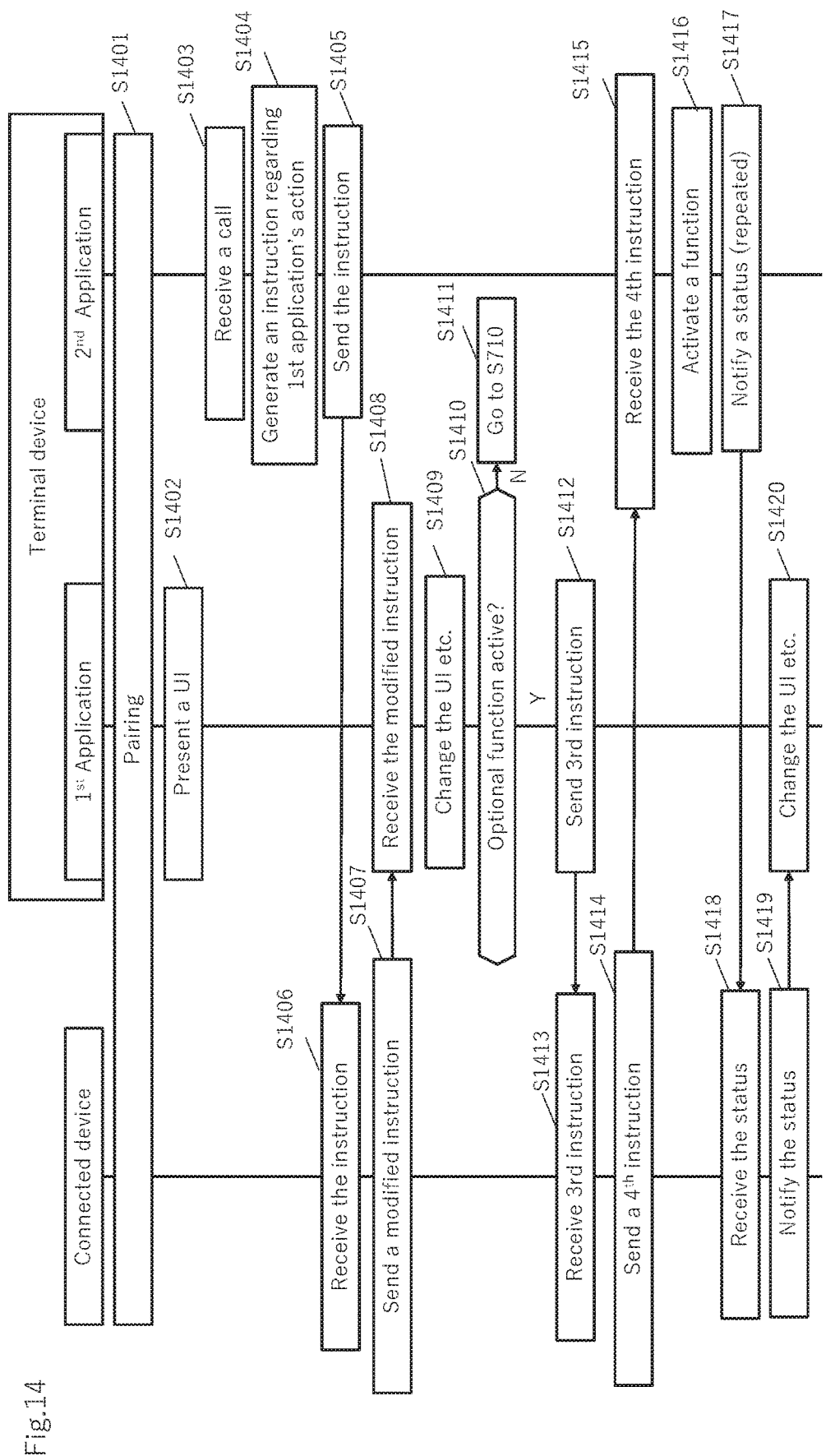

FIG. 14 is a chart illustrating the outline of the telephone incoming operation.

In Step S1401, the pairing is performed similarly to Step S501.

In Step S1402, the UI of the first application is displayed in the terminal device 1 similarly to Step S502.

In Step S1403, the second application receives the incoming from the outside. In this embodiment, when the second application receives the incoming from the outside, the UI of the second application is displayed in the terminal device 1, and the UI of the first application may be shifted to the background.

In Step S1404, the second application generates the first instruction related to the operation of the first application. The first instruction related to the operation of the first application means "the instruction which can exhibit the function of the first application when the first application interprets at least a part of the instruction" and/or "the instruction which can exhibit the function of the first application when the first application generates an argument with at least a part of the instruction or generates an argument on the basis of at least a part of the instruction". In the telephone incoming operation, the calling state transferring the state of the incoming and a telephone number of an incoming call source are the contents of the first instruction.

In Step S1405, the second application transmits the first instruction generated in Step S1404 to the connected device 2. The first instruction is transmitted using the BT protocol.

In Step S1406, the connected device 2 receives the first instruction.

In Step S1407, the connected device 2 transmits the second instruction obtained by modifying the first instruction and the first application using the BLE protocol on the basis of the first instruction.

In Step S1408, the first application receives the second instruction.

In Step S1409, the first application performs the recording in the first application of the calling state and the updating of the UI of the first application on the background on the basis of the second instruction. Specifically, with such an updating of the UI, the UI of the first application displayed after the second application ends can be updated to an appropriated content according to the calling state. For example, the calling time acquired from the calling state can be displayed on the first application after the calling ends.

In Step S1410, the first application determines whether an option function is effective. The option function in this embodiment is a function of automatically reacting to the incoming, and includes at least an automatic answering function to the incoming, an automatic reject function to the incoming, and an automatic message response function to the incoming. The enabling of the option function can be set individually in the first application, and also can be set individually in the connected device 2. Further, in a case where the option function is disabled, the process is joined to Step S710 in FIG. 7 (Step S1411).

In Step S1412 (Yes in Step S1410), the first application generates a third instruction according to the content of the enabled option function, and transmits the third instruction to the connected device 2 using the BLE protocol. Herein, the meaning of the third instruction is the same as that of the first instruction described in Step S503. Specifically, the content of the third instruction according to the content of the (enabled) option function will be described below.

Option Function Third Instruction

Automatic Answering Function Answering Request

Automatic Reject Function Calling End Request

Automatic Message Response Function Calling End Request

Automatic Message Response Function Message Transmission
Request+Telephone Number+Content of Text Further, there are two types of third instructions in the automatic message response function, which means that the calling end request is first transmitted as the third instruction, the second application performs the calling end process, and Message Transmission Request+Telephone Number+Content of Text is transmitted again as the third instruction.

In Step S1413, the connected device 2 receives the third instruction.

In Step S1414, the connected device 2 generates a fourth instruction by modifying (arbitrarily) the third instruction similarly to S506, and transmits the fourth instruction to the second application using the BT protocol.

In Step S1415, the second application receives the fourth instruction.

In Step S1416, the second application performs the function thereof. The execution is an operation which is performed on the basis of the fourth instruction. The content of the performed function is based on the content of the third instruction. In other words, if the third instruction is an answering request, the answering to the incoming is performed. If the third instruction is a calling end request, the calling end is performed to the incoming. If the third instruction is Message Transmission Request+Telephone Number+Content of Text, a message containing the content of the text is transmitted to the telephone number.

In Step S1417, similarly to Step S510, the state of the second application is transmitted to the connected device 2.

In Step S1418, similarly to Step S511, the state of the second application is received to the connected device 2.

In Step S1419, similarly to Step S512, the state of the second application is notified to the first application.

In Step S1420, similarly to Step S513, the first application records the calling state and updates the UI on the basis of the state of the second application. Further, as described above, in a case where the option function is the automatic message response function, there are two types of third instructions. In this case, Message Transmission Request+Telephone Number+Content of Text is transmitted to the connected device 2 as the third instruction in Step S1412 during Step S1420 after the operation (Step S1416) on the basis of the calling end request.

Hitherto, the method of controlling the terminal device 1 for each operation of the individual function of the second application has been described. Specifically, the first application can be controlled by interposing the connected device 2 even in a case where the second application is prohibited from being directly controlled from the other application.

[Other Examples of Configuration]

As described above, the disclosure relates to the method of properly controlling the terminal device 1 even in a case where the user can hardly keep his vision focused on the terminal device 1. Therefore, various terminal devices 1 and various connected devices 2 may be combined as long as the disclosure does not depart from the spirit.

As an example of this embodiment, the smart phone has been described as the terminal device 1. However, the terminal device 1 is not limited to the smart phone. The disclosure can be applied to any case as long as the second application is prohibited from being directly controlled from the other application. For example, the terminal device 1 may be a tablet, a PC, a general-use terminal, or a dedicated terminal.

As an example of this embodiment, the vehicle (including an information processing device which is mounted or installed in the vehicle) has been described as the connected device 2. However, the connected device 2 is not limited to the vehicle. The disclosure may be applied to any device as long as the device can communicate with the terminal device 1. For example, the connected device 2 may be applied to an electric car, a bicycle, an airplane, a dedicated terminal, a smart phone, a tablet, a PC, a general-use terminal, and a dedicated terminal.

As an example of the second application in this embodiment, an application which is installed in iOS or Android OS as default, an application which is provided officially, or an application which is created by a third party may also be considered.

In addition, in this embodiment, the smart phone has been described as the terminal device 1. Therefore, the phrase "to display the UI" has been described on an assumption that the UI is displayed almost in a full screen mode on the terminal device 1. However, the meaning of "to display the UI" is not limited only to the full screen mode if the UI occupies the dominant region on the terminal device 1 such that the user can operate even out of sight. For example, even a configuration that the screen of the first or second application is displayed in some of the windows in a case where a plurality of windows are logically displayed in the screen of a tablet can also be said as "to display the UI".

In addition, this embodiment has been described about an example where the operation on the first application and the second application is performed through an input device such as a touch screen installed in the terminal device 1. However, the operation on the first application and the second application may be performed from an input device 23 (steering key) of the connected device 2. In a case where the operation is performed on the first application and the second application from the input device 23 of the connected device 2, a command corresponding to each operation is transmitted using the BLE protocol or the BT protocol.

In addition, this embodiment has been described focusing on an example where the information is exchanged between the user and the terminal device 1 using a physical input/output device such as a touch panel. The exchange of information using SP/MIC is also included in a scope of the disclosure.

In addition, in this embodiment, the first application has acquired the state of the second application through the connected device 2. However, the acquired state or a state collectively obtained by shifting the acquired state may be transmitted to an external server. In addition, the external server may analyze the state of the second application and transmit the information (comment information and information related to driving as an example) to the user.

[Automatic Answering Operation on System Dialogue]

In the following, as another example of the configuration, an automatic answering operation on a system dialogue will be described.

The system dialogue is a type of a message which is presented to the user by the OS of the terminal device 1. The system dialogue is to request a response to the user. The system dialogue is normally displayed with the message and the user's response as buttons, and displayed in the touch panel display 13 so as to be presented to the user. As an example of the system dialogue, there are (1) one which can be presented to the user before the phone calling operation (the message and the button (for example, "OK" button) to allow the user to start a call), and (2) one which can be presented to the user before a text is transmitted (the message and the button (for example, "Transmission" button) to allow the user to start the message).

The display operation of the system dialogue may be realized by a default of the OS. Therefore, when the function of the second application is exhibited, the system dialogue is forcibly displayed in a touch panel display.

However, the terminal device 1 can be appropriately controlled even in a case where the terminal device 1 exists out of sight. Therefore, the system dialogue is desirably processed without the user's response as much as possible.

In this embodiment, at a timing when the system dialogue appears, the first application transmits a command (fifth command) to the second application so as to make a response to the system dialogue. The connected device 2 receives the fifth command, and transmits a command (sixth command) to the second application so as to make a response to the system dialogue. As a specific example of the content of the sixth command, there is a command to input a key code for deleting the system dialogue to the second application with respect to the system.

Then, the system dialogue receives a response almost instantly after being displayed and disappears. Therefore, the response to the system dialogue can be completed without causing the user to be much aware of the appearance of the system dialogue. For example, in the case of making a phone call, if the user completes the input for making a phone call to a first application, the system dialogue to be displayed thereafter disappears even if there is no response of the user. Therefore, a load for the user can be reduced. In addition, it is possible to improve a response speed of the terminal device 1 as a whole system.

However, the timing when the system dialogue appears is different depending on the function of the second application to be exhibited. In addition, how accurately the first application recognizes the timing of appearance of the system dialogue is also different.

Therefore, for example, in a case where the function of the second application to be exhibited is to request the first application to be shifted to the background (for example, phone call function), the following process is performed. Specifically, the first application controls the connected device 2 such that the sixth command reaches the second application after a predetermined time interval when the user inputs the start of the function of the second application to the first application. This is because it is difficult to accurately grasp at which timing the system dialogue is displayed after the first application is shifted to the background. Further, as a specific mounting example that the command is reached after a predetermined time interval, there is a case where the fifth command is transmitted after the first application counts a predetermined time. In addition, the first application may transmit the fifth command such that the sixth command is transmitted after the CPU 21 of the connected device 2 counts a predetermined time.

In addition, in a case where the function of the second application to be exhibited is a function (for example, test transmission function) which does not request the first application to be shifted to the background, the first application transmits the fifth command to the connected device 2 after an event of notifying the displaying of the system dialogue is received from the OS. The method can more surely cause the system dialogue to disappear.

Further, the system dialogue may be displayed in the screen for a short time depending on a specific design idea of the mounting and an operation status/specification of a terminal device 1 even in a case where the above mounting is performed.

[Registration Operation of Key Code]

In the following, as another example of the configuration, the registration operation of the key code will be described.

The key code is information indicating that a specific key or a key sequence is input to the terminal device 1 when the key code is recognized by the terminal device 1.

In a case where the function is exhibited in the second application, a predetermined key code may be necessarily input to the terminal device 1. However, even though the functions are the same (for example, voice assistant function), the key code to exhibit the function may be different depending on the type of the terminal device 1. The type of the terminal device 1 is defined by the type of the OS, the model of the terminal device 1, and the version of the OS.

In this embodiment, the first application determines the type of the terminal device 1 in which the first application is installed. Then, the first application registers the key code which corresponds to the determined type and indicates an input to exhibit the function of the second application to the memory 22 of the connected device 2 through the communication module 15. When the first application is activated and the function of the second application input to the connected device 2 is exhibited (for example, if the connected device 2 is a vehicle, a voice assistant function start button disposed near the steering wheel of the vehicle is pressed), the connected device 2 commands the second application to exhibit the function of the desired second application by transmitting the key code to the terminal device 1 with reference to the registered key code.

With this configuration, when the input to the connected device 2 (for example, if the connected device 2 is a vehicle, the voice assistant function start button disposed near the steering wheel of the vehicle is pressed) is performed, it is possible to omit a time to inquire the type of the terminal device 1 to the first application. Therefore, a processing speed of the terminal device 1 is improved.

In addition, the communication module may issue a command to exhibit the function of the desired second application with reference to the registered key code when the command is transmitted to the second application in the above-described embodiment.

[Conclusion]

As described above, the disclosure includes the following configurations, so that the functions of the terminal device 1 or the connected device 2 are improved.

As a configuration of the disclosure, there is provided a control method of the terminal device 1 which includes an OS, a first application, and a second application installed in the OS as a default function which is included in the OS. The method includes transmitting, by the first application, a first instruction to a connected device 2, the first instruction being related to an operation of the second application, receiving, by the terminal device 1, a second instruction transmitted by the connected device 2 on the basis of a content of the first instruction, and operating the second application on the basis of the second instruction.

With such a configuration, the second application can be controlled by interposing the connected device 2 even in a case where the second application is prohibited from being directly controlled by the other application. Therefore, it is possible to more properly control the terminal device 1.

In addition, as a configuration of the disclosure, the first instruction and the second instruction are transmitted in protocols different from each other.

With such a configuration, even in a case where the communication protocol is different from that of the connected device 2, the first application can be controlled by interposing the connected device 2. Therefore, it is possible to more properly control the terminal device 1.

In addition, as a configuration of the disclosure, the first instruction is transmitted to the connected device 2 in a state where a display screen of the first application is displayed.

With such a configuration, it is possible to give the user an experience of directly operating the second application by the operation on the first application.

Further, an example of "the first instruction is transmitted to the connected device 2 in a state where a display screen of the first application is displayed" includes a state where the display screen of the first application is displayed when the operation causing a trigger to generate the first instruction is performed.

In addition, as a configuration of the disclosure, the second application is one of a telephone function, a message transceiving function, a music play function, and a voice assistant function.

With such a configuration, it is possible to properly operate the application which is frequently used in a case where the user hardly keeps focusing on the terminal device 1 and is needed for the user to focus.

In addition, as a configuration of the disclosure, the OS prohibits the second application from being directly controlled from the first application.

With such a configuration, it is possible to properly control the terminal device 1 even in a case where the direct control is strongly prohibited at the OS level.

In addition, as a configuration of the disclosure, the OS is iOS.

With such a configuration, it is possible to properly control the terminal device 1 even in a case where the direct control is strongly prohibited at the OS level.

In addition, as a configuration of the disclosure, when the second application operates on the basis of the second instruction, the display screen of the first application is ended, and a display screen of the second application is displayed. When the second application ends an operation on the basis of the second instruction, the display screen of the second application is ended, and the display screen of the first application is displayed.

With such a configuration, the screen of the second application can be presented as needed while presenting the screen of the first application to the user at a normal time. Therefore, it is possible to more properly control the terminal device 1.

In addition, as a configuration of the disclosure, when the second application operates on the basis of the second instruction, the second application operates in a background while the display screen of the first application is displayed.

With such a configuration, in a case where the screen of the first application can present more appropriate information to the user compared to the screen of the second application, it is possible to more properly control the terminal device 1.

In addition, as a configuration of the disclosure, when the second application operates on the basis of the second instruction, the first application operates in a background while a display screen of the second application is displayed.

With such a configuration, even in a case where the UI of the foreground is shifted from the second application to the first application, the first application operates in the background. Therefore, it is possible to present the appropriate screen.

In addition, as a configuration of the disclosure, the first application includes a display screen which occupies a full screen of the terminal device 1. The first instruction is transmitted when a dominant region in the display screen is touched for operation.

With such a configuration, even in a case where the user hardly keeps focusing on the terminal device 1, the terminal device 1 can properly operate.

In addition, as a configuration of the disclosure, the connected device 2 is a vehicle. The terminal device 1 is connected to the vehicle through a predetermined communication protocol. When the second application operates on the basis of the second instruction, an output function of the vehicle operates through the predetermined communication protocol.

With such a configuration, even in a case where the specification for connecting the connected device 2 and the terminal device 1 is determined, the terminal device 1 can be properly controlled using the specification.

In addition, as a configuration of the disclosure, the second application is an application which has a call function. The terminal device 1 transmits a calling state of the call function to the connected device 2 after the second application performs a call operation on the basis of the second instruction. The terminal device 1 receives the calling state from the connected device 2. The first application operates on the basis of the calling state.

With such a configuration, it is possible to properly process the first application according to the calling state.

In addition, as a configuration of the disclosure, there is provided a control method of a terminal device which includes an OS, a first application, and a second application installed in the OS as a default function which is included in the OS. The method includes transmitting, by the second application, a first instruction to a connected device, the first instruction being related to an operation of the first application, receiving, by the terminal device, a second instruction transmitted by the connected device on the basis of a content of the first instruction, and operating the first application on the basis of the second instruction.

With such a configuration, even in a case where the second application operates on the basis of the default function of the OS, the first application can be properly controlled.

In addition, as a configuration of the disclosure, the second application is an application which has a call function. The terminal device 1 transmits a third instruction, the third instruction indicating that the first application changes a display screen of the first application on the basis of the second instruction, and processes an incoming call to the call function, to the connected device 2. The terminal device 1 receives a fourth instruction which is transmitted from the connected device 2 on the basis of a content of the third instruction. The first application operates on the basis of the fourth instruction.

With such a configuration, even in a case where the second application operates on the basis of the incoming call to the telephone function, the first application can be properly controlled.

In addition, as a configuration of the disclosure, there is provided a method of controlling a terminal device 1 which communicates with a connected device 2 and is controlled by the connected device 2. The connected device 2 receives a first instruction from a first application of the terminal device 1. In a case where the first instruction includes at least a telephone number of another device, the connected device 2 transmits a second instruction, the second instruction instructing a second application of the terminal device 1 to make a phone call to the telephone number, to the terminal device 1.

With such a configuration, the first application can be controlled by interposing the connected device 2 even in a case where the second application is prohibited from being directly controlled by the other application. Therefore, it is possible to more properly control the terminal device 1.

In addition, as a configuration of the disclosure, there is provided a method of controlling a terminal device 1 which communicates with a connected device 2 and is controlled by the connected device 2. The connected device 2 receives a first instruction from a first application of the terminal device 1. In a case where the first instruction is to transmit music information related to music which is played by a second application of the terminal device 1 to the terminal device 1, the connected device 2 transmits a second instruction, the second instruction instructing the second application to transmit the music information to the connected device 2, to the terminal device 1.

With such a configuration, even when the music information is hard to be directly exchanged between the first application and the second application, the terminal device 1 can be properly controlled.

In addition, as a configuration of the disclosure, in a case where the first instruction is to transmit the music information to the terminal device 1, and in a case where the connected device 2 does not store the music information, the connected device 2 transmits the second instruction to the terminal device 1.

With such a configuration, it is possible to reduce the communication amount between the connected device 2 and the terminal device 1.

In addition, as a configuration of the disclosure, the OS displays a system dialogue when a second application operates on the basis of the second instruction. The first application transmits a fifth instruction to the connected device to cause the second application to make a response to the system dialogue. A sixth instruction transmitted on the basis of a content of the fifth instruction is received from the connected device. The second application responds to the system dialogue on the basis of the sixth instruction.

With such a configuration, it is possible to reduce a user's labor in responding to the system dialogue, so that the operability of the terminal device is improved.

In addition, as a configuration of the disclosure, the fifth instruction is transmitted after a predetermined time is counted when the first application transmits the first instruction.

With such a configuration, the response to the system dialogue is made surely, so that the operability of the terminal device is improved.

In addition, as a configuration of the disclosure, the fifth instruction contains a control content that the sixth instruction is transmitted to the connected device after a predetermined time is counted.

With such a configuration, the response to the system dialogue is made surely, so that the operability of the terminal device is improved.

In addition, as a configuration of the disclosure, the second application determines a type of the terminal device in which the second application is installed. A key code which corresponds to the determined type and indicates an input to exhibit a function of the second application is registered in the connected device.

With such a configuration, the terminal device is easily operated from the connected device, so that the operability of the terminal device is improved.

The invention claimed is:

1. A control method of a terminal device which includes an operating system (OS), a first application, and a second application installed in the OS as a default function which is included in the OS, comprising:
   transmitting, by the first application, a first instruction to a connected device, the first instruction being related to an operation of the second application;
   receiving, by the terminal device, a second instruction transmitted by the connected device on the basis of a content of the first instruction; and
   operating the second application on the basis of the second instruction, wherein the OS prohibits the second application from being directly controlled by the first application.

2. The control method of the terminal device according to claim 1, wherein the first instruction and the second instruction are transmitted in protocols different from each other.

3. The control method of the terminal device according to claim 1, wherein the first instruction is transmitted to the connected device in a state where a display screen of the first application is displayed.

4. The control method of the terminal device according to claim 3, wherein, when the second application operates on the basis of the second instruction, the display screen of the first application is ended, and a display screen of the second application is displayed, and wherein, when the second application ends an operation on the basis of the second instruction, the display screen of the second application is ended, and the display screen of the first application is displayed.

5. The control method of the terminal device according to claim 3, wherein, when the second application operates on the basis of the second instruction, the second application operates in a background while the display screen of the first application is displayed.

6. The control method of the terminal device according to claim 3, wherein, when the second application operates on the basis of the second instruction, the first application operates in a background while a display screen of the second application is displayed.

7. The control method of the terminal device according to claim 3, wherein the first application includes a display screen which occupies a full screen of the terminal device, and wherein the first instruction is transmitted when a dominant region in the display screen is touched for operation.

8. The control method of the terminal device according to claim 3, wherein the connected device is a vehicle, wherein the terminal device is connected to the vehicle through a predetermined communication protocol, and wherein, when the second application operates on the basis of the second instruction, an output function of the vehicle operates through the predetermined communication protocol.

9. The control method of the terminal device according to claim 3, wherein the second application is an application which has a call function, wherein the terminal device transmits a calling state of the call function to the connected device after the second application performs a call operation on the basis of the second instruction, wherein the terminal device receives the calling state from the connected device, and wherein the first application operates on the basis of the calling state.

10. The control method of the terminal device according to claim 1, wherein the second application is one of a telephone function, a message transceiving function, a music play function, and a voice assistant function.

11. The control method of the terminal device according to claim 1, wherein the OS is iOS.

12. The control method of the terminal device according to claim 1, wherein the OS displays a system dialogue when a second application operates on the basis of the second instruction, wherein the first application transmits a fifth instruction to the connected device to cause the second application to respond to the system dialogue, wherein a sixth instruction transmitted on the basis of a content of the fifth instruction is received from the connected device, and wherein the second application responds to the system dialogue on the basis of the sixth instruction.

13. The control method of the terminal device according to claim 12, wherein the fifth instruction is transmitted after a predetermined time is counted when the first application transmits the first instruction.

14. The control method of the terminal device according to claim 12, wherein the fifth instruction contains a control content that the sixth instruction is transmitted to the connected device after a predetermined time is counted.

15. The control method of the terminal device according to claim 1, wherein the second application determines a type of the terminal device in which the second application is installed, and wherein a key code which corresponds to the determined type and indicates an input to exhibit a function of the second application is registered in the connected device.

16. A control method of a terminal device which includes an operating system (OS), a first application, and a second application installed in the OS as a default function which is included in the OS, comprising:
    transmitting, by the second application, a first instruction to a connected device, the first instruction being related to an operation of the first application;
    receiving, by the terminal device, a second instruction transmitted by the connected device on the basis of a content of the first instruction; and
    operating the first application on the basis of the second instruction, wherein the OS prohibits the second application from being directly controlled by the first application.

17. The control method of the terminal device according to claim 16, wherein the second application is an application which has a call function, wherein the terminal device transmits a third instruction, the third instruction indicating that the first application changes a display screen of the first application on the basis of the second instruction, and processes an incoming call to the call function, to the connected device, wherein the terminal device receives a fourth instruction which is transmitted from the connected device on the basis of a content of the third instruction, and wherein the first application operates on the basis of the fourth instruction.

18. A method of controlling a terminal device which communicates with a connected device and is controlled by the connected device,
    wherein the connected device receives a first instruction from a first application of the terminal device, and
    wherein, in a case where the first instruction includes at least a telephone number of another device, the connected device transmits a second instruction, the second instruction instructing a second application of the terminal device to make a phone call to the telephone number, to the terminal device.

19. A method of controlling a terminal device which communicates with a connected device and is controlled by the connected device,
    wherein the connected device receives a first instruction from a first application of the terminal device, and
    wherein, in a case where the first instruction is to transmit music information related to music which is played by a second application of the terminal device to the terminal device, the connected device transmits a second instruction, the second instruction instructing the second application to transmit the music information to the connected device, to the terminal device.

20. The control method of the terminal device according to claim 19, wherein, in a case where the first instruction is to transmit the music information to the terminal device, and in a case where the connected device does not store the music information, the connected device transmits the second instruction to the terminal device.

* * * * *